Dec. 24, 1929.   G. F. WIKLE   1,740,635
TIRE BUILDING MACHINE

Filed Sept. 6, 1927

INVENTOR.
GEORGE F. WIKLE.
BY
Robert M. Harvey
ATTORNEY.

Patented Dec. 24, 1929

1,740,635

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE-BUILDING MACHINE

Application filed September 6, 1927. Serial No. 217,593.

This invention relates to tire building machines and more particularly to that type of machine in which the tire carcass is built upon a drum or pulley. It has for its object the provision of a device which will accurately and substantially automatically position two bead cores simultaneously upon the carcass plies built up on the drum. Other and further objects will be apparent from the following specification and claims. In the accompanying drawings which illustrate one embodiment of the invention, Fig. 1 is an end elevation of the device showing the parts in operative position;

Figure 1:
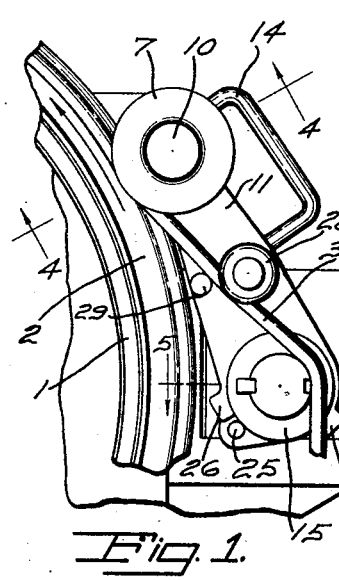
Figure 2:
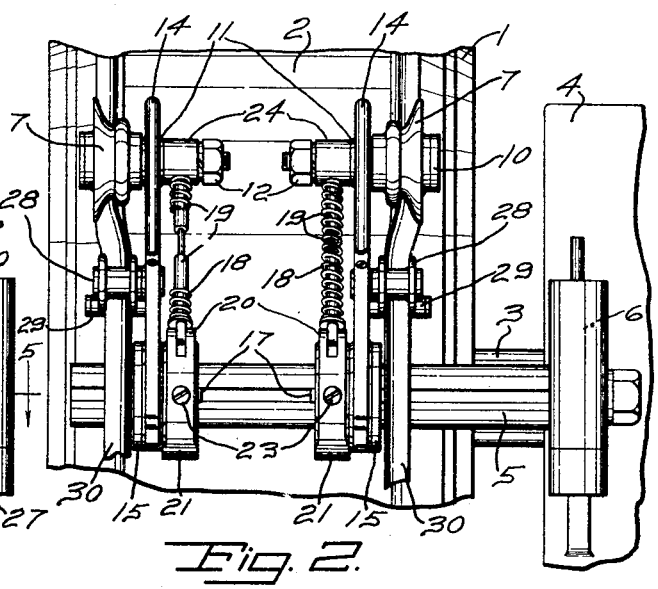
Fig. 2 is a front elevation of the structure shown in Fig. 1.
Figure 3:
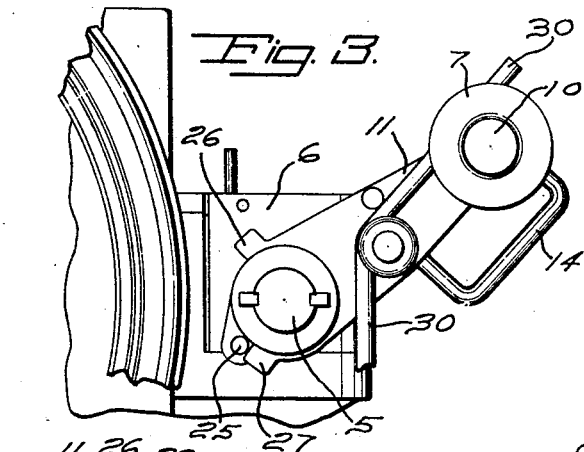
Fig. 3 is a view similar to Fig. 1, but showing the parts in inoperative position.
Figure 4:
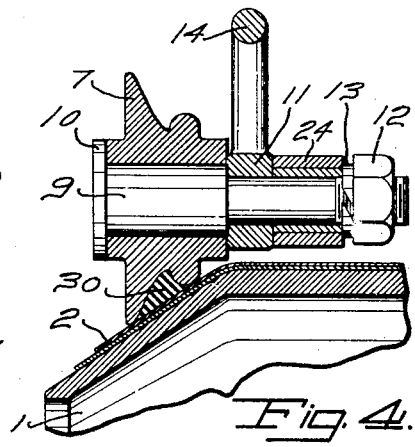
Fig. 4 is a section on line 4—4 of Fig. 1.
Figure 5:
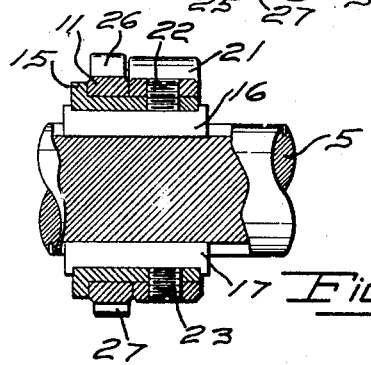
Fig. 5 is a section on line 5—5 of Fig. 1.
Figures 6, 7:
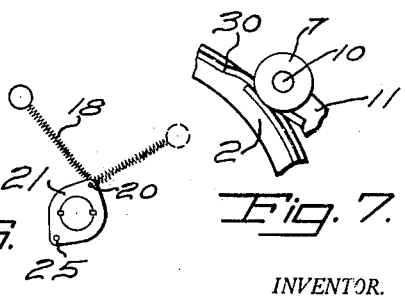
Fig. 6 is a diagrammatic view showing the operation of the positioning spring.
Fig. 7 is a detail view showing the bead strip applied and in position to be cut.

Referring to the drawings, 1 designates the building drum upon which the tire carcass 2 has been built. The drum 1 is mounted upon a rotatable shaft 3 driven from a suitable source of power enclosed in housing 4. 5 designates the shaft upon which the bead applying instrumentalities are supported and this shaft is preferably pivoted at 6 to the housing 4. The bead setting rolls 7 are rotatably mounted on stub shafts 9, having retaining head 10, carried by arms 11. Shafts 9 are held in position by nuts 12 and lock washers 13. The arms 11 are provided with handles 14 and are freely rotatable upon collars 15 splined at 16 and 17 to shaft 5. The arms 11 are held in operative or inoperative position as shown in Figs. 1 and 3, respectively, by means of springs 18 surrounding telescoping rods 19. The latter are pivoted at their lower ends as at 20 to collars 21, which are held in fixed position on collars 15 by means of set screws 22 and 23. As is best shown in Fig. 5, set screws 22 and 23 are threaded through both collars 15 and 21 and set against splines 16 and 17 thus holding collars 15 in adjusted position on shaft 5. The upper ends of telescoping rods 19 are secured to bearings 24 mounted on stub shafts 9. Fixed collars 21 are provided with stop pins 25 adapted to engage lugs 26 formed on arms 11 to limit the forward movement of the latter and to engage similar lugs 27 to limit the rearward movement of the arms when bead setting rolls 7 are in inoperative position as shown in Fig. 3. Arms 11 also support flanged guide rolls 28 and smooth guide rolls 29 between which the bead cores 30 are drawn as will now be described. Assuming the end of a strip of bead core 30 to be threaded between rolls 28 and 29, as shown in Fig. 3, the bead core 30 is drawn forward sufficiently to project beyond and beneath rolls 7. Arms 11 are then moved from the position shown in Fig. 3 to that shown in Fig. 1 and the building drum 1 is set in rotation in the direction shown by the arrow in Fig. 1 to draw forward the bead core 30 between rolls 28 and 29 and beneath the bead setting rolls 7, the latter contoured to substantially fit the bead core and accurately position it. During this operation the arms 11 are held against the drum by springs 18 as indicated in Fig. 6. At the completion of the revolution of the building drum the bead core is cut as shown in Fig. 3, and the arms 11 move to the position shown in the latter figure in which position they are held by springs 18 as shown in dotted line in Fig. 6, the pivot 20 being positioned at the dead center of the limited swing of arms 11.

Having thus described my invention, I claim:

1. A device of the character described comprising a pair of independently pivoted arms adapted to be positioned adjacent the drum of a tire building machine, contoured bead setting rolls and bead guide rolls carried by the arms, and means associated with the arms to urge the latter toward the drum.

2. A device of the character described comprising a pair of independently pivoted arms adapted to be positioned adjacent the drum of a tire building machine, contoured bead setting rolls and bead guide rolls carried by the arms and springs operative when the arms are in bead setting position to press the rolls carried by the arms toward the drum and when the arms are in inoperative position to retain them in that position.

3. A device of the character described comprising a pair of independently pivoted arms adapted to be positioned adjacent the drum of a tire building machine, means to adjust the arms transversely with respect to the surface of the drum, bead setting rolls and bead guide rolls carried by the arms and means associated with the arms to urge the latter toward the drum.

4. A device of the character described comprising a support adapted to be positioned adjacent the drum of a tire building machine, a pair of members carried by said support and adjustable therealong, an arm mounted for limited pivotal movement on each of said members, a fixed collar associated with each of said members, springs connecting the free ends of the arms and the respective collars at the dead center of the pivotal movement of the arms and bead setting rolls mounted for free rotation on the free ends of the arms.

GEORGE F. WIKLE.